(12) United States Patent
Riddell (10) Patent No.: US 7,922,454 B1
(45) Date of Patent: Apr. 12, 2011

(54) JOINT DESIGN FOR ROTOR BLADE SEGMENTS OF A WIND TURBINE

(75) Inventor: Scott Gabell Riddell, Greer, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/915,686

(22) Filed: Oct. 29, 2010

(51) Int. Cl.
*F03D 11/00* (2006.01)

(52) U.S. Cl. .......... 416/224; 416/226; 416/228

(58) Field of Classification Search .......... 416/224, 416/226, 228, 232, 241 R; 403/292, 293, 403/359.1, 359.6, 383
See application file for complete search history.

(56) References Cited

U.S. PATENT DOCUMENTS

| | | | |
|---|---|---|---|
| 7,186,086 B2 * | 3/2007 | Yoshida | 416/146 R |
| 7,427,189 B2 | 9/2008 | Eyb | |
| 7,470,114 B2 | 12/2008 | Bonnet | |
| 2008/0181781 A1 | 7/2008 | Livingston et al. | |
| 2009/0155084 A1 * | 6/2009 | Livingston et al. | 416/223 R |
| 2009/0162206 A1 * | 6/2009 | Zirin et al. | 416/223 R |
| 2010/0310379 A1 * | 12/2010 | Livingston | 416/229 R |

FOREIGN PATENT DOCUMENTS

| | | |
|---|---|---|
| WO | WO 01/46582 | 6/2001 |
| WO | WO 2005/064156 | 7/2005 |

OTHER PUBLICATIONS

Related U.S. Appl. No. 12/431,281, filed Apr. 28, 2009.

* cited by examiner

*Primary Examiner* — Ninh H Nguyen
(74) *Attorney, Agent, or Firm* — Dority & Manning, P.A.

(57) ABSTRACT

A blade segment of a rotor blade assembly formed from two or more blade segments is disclosed. The blade segment may generally include a body shell and a shear web extending longitudinally within the body shell. The shear web may be disposed between opposed spar caps. The blade segment may also include an attachment member and a spar member. The attachment member may be at least partially disposed within the body shell. The spar member may generally extend outwardly from the spar caps along an inner surface of the body shell and may be configured to support the attachment member within the body shell.

20 Claims, 7 Drawing Sheets

JOINT DESIGN FOR ROTOR BLADE SEGMENTS OF A WIND TURBINE

FIELD OF THE INVENTION

The present subject matter relates generally to rotor blades for a wind turbine, and more particularly to a joint design for joining blade segments of a rotor blade assembly of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size of the rotor blades is a significant factor that contributes to the energy efficiency of a wind turbine. In particular, an increase in rotor blade size generally leads to an overall increase in the energy production of a wind turbine. Accordingly, efforts to increase rotor blade size aid in the continuing growth of wind turbine technology and the adoption of wind energy as an alternative energy source. However, as the size of the rotor blades used in wind turbines increases, so do the respective costs of manufacturing, transporting, and assembling such rotor blades. For example, the costs of preforming, transporting, and erecting significantly long rotor blades may significantly impact the economic advantage of a larger wind turbine.

One known strategy for reducing the costs of pre-forming, transporting, and erecting wind turbines having rotor blades of increasing sizes is to manufacture the rotor blades in blade segments. The blade segments may then be assembled to form the rotor blade after, for example, the individual blade segments are transported to the field. However, known joint deigns for connecting the blade segments together typically have a variety of disadvantages. For example, many known joint designs do not provide for sufficient alignment of the blade segments. As such, a significant amount of time is wasted in aligning the blade segments for assembly of the rotor blade. Additionally, many known joint designs include various complex interconnecting components, thereby increasing the amount of time needed to assemble the blade segments.

Accordingly, there is a need for a joint design for wind turbine rotor blade segments which simplifies the assembly of the blade segments into a rotor blade and also allows for a more accurate assembly of the blade segments into a rotor blade.

BRIEF DESCRIPTION OF THE INVENTION

Aspects and advantages of the invention will be set forth in part in the following description, or may be obvious from the description, or may be learned through practice of the invention.

In one aspect, the present subject matter discloses a blade segment of a rotor blade assembly formed from two or more blade segments. The blade segment may generally include a body shell defining a generally aerodynamic profile and a shear web extending longitudinally within the body shell. The shear web may be disposed between opposed spar caps. The blade segment may also include an attachment member and a spar member. The attachment member may be at least partially disposed within the body shell and may be configured to mate with a corresponding attachment member of a secondary blade segment. The spar member may generally extend outwardly from the spar caps along an inner surface of the body shell and may be configured to support the attachment member within the body shell. Additionally, a chordwise width of the spar member may diverge as the spar member extends from the spar caps such that the spar member engages at least a portion of an outer perimeter of the attachment member.

In another aspect, the present subject matter discloses a rotor blade assembly for a wind turbine. The rotor blade assembly may comprise a first blade segment and a second blade segment. The first blade segment may generally include a body shell and a shear web disposed between opposed spar caps. The first blade segment may also include a post member and a spar member. The post member may have a first portion extending outwardly from the body shell and a second portion disposed within the body shell. The spar member may extend outwardly from the spar caps and may define a diverging chordwise width such that the spar member engages at least a portion of an outer perimeter of the second portion of the post member. The second blade segment of the rotor blade assembly may generally include a body shell and a shear web disposed between opposed spar caps. The second blade segment may also include a recess member and a spar member. The recess member may generally be disposed within the body shell and may define a cavity configured to receive the first portion of the post member. The spar member may extend outwardly from the spar caps and may define a diverging chordwise width such that the spar member engages at least a portion of an outer perimeter of the recess member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
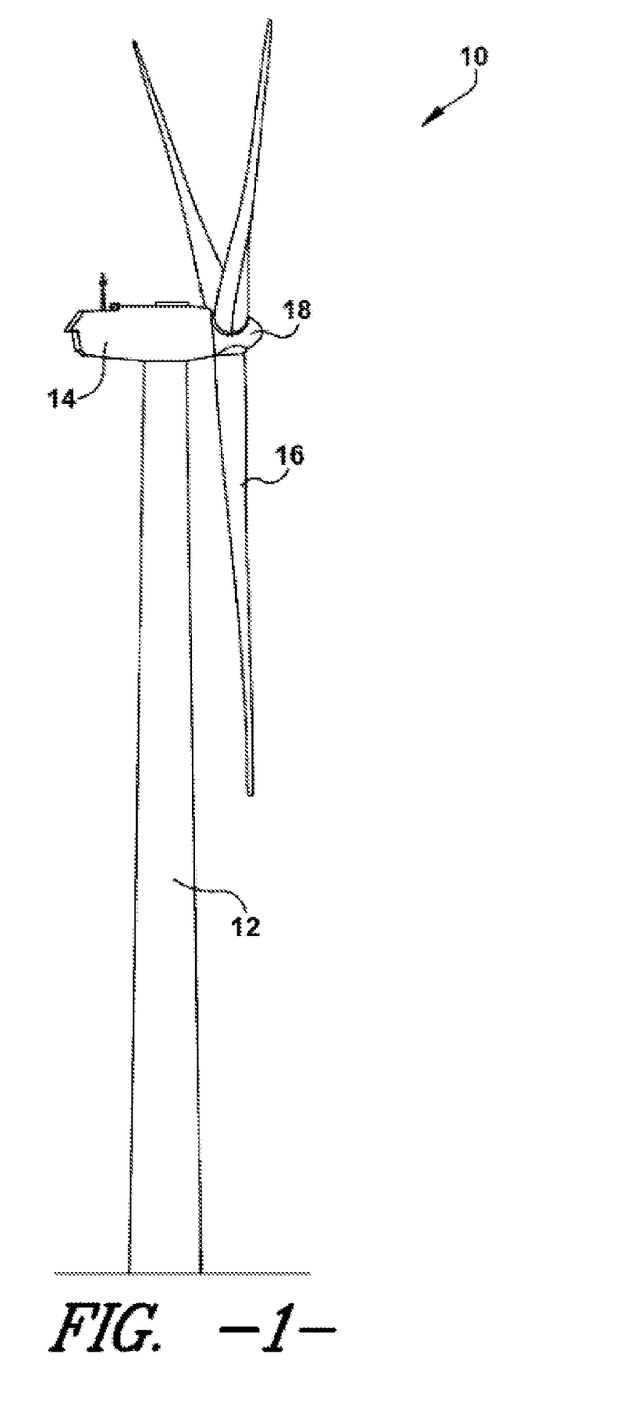
FIG. 1 illustrates a perspective view of a wind turbine of conventional construction.

Referring now to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
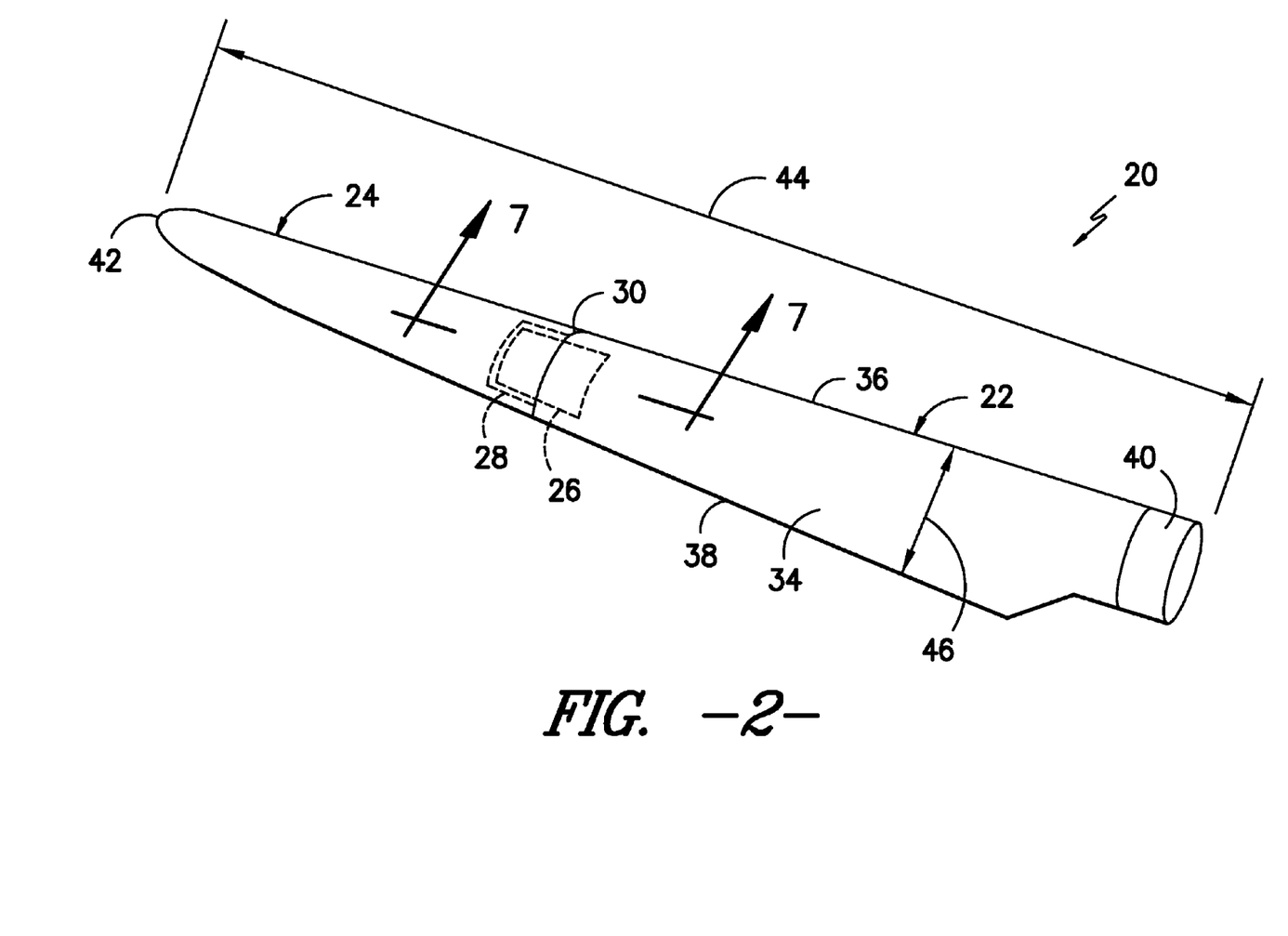
FIG. 2 illustrates a perspective view of one embodiment of a rotor blade assembly in accordance with aspects of the present subject matter.

Referring now to FIG. 2, a perspective view of one embodiment of a rotor blade assembly 20 is illustrated in accordance with aspects of the present subject matter. In general, the rotor blade assembly 20 may include a plurality of blade segments 22, 24. For example in the illustrated embodiment, the rotor blade assembly 20 may include a first blade segment 22 and a second blade segment 24. The first and second blade segments 22, 24 may generally be configured to be secured to one another. For example, the first blade segment 22 may include an attachment member 26 configured to be attached to a corresponding attachment member 28 of the second blade segment 24 in order to form a joint 30 between the blade segments 22, 24. As such, when the blade segments 22, 24 are assembled, the rotor blade assembly 20 may generally define complete rotor blade having a substantially continuous aerodynamic profile. It should be appreciated that, although the rotor blade assembly 20 of the present subject matter is illustrated and described herein as including two blade segments 22, 24, the rotor blade assembly 20 may generally comprise any number of blade segments configured as described and illustrated herein.

As shown, the rotor blade assembly 20 may generally include a suction side 34 and a pressure side 32 (FIG. 3) extending between a leading edge 36 and a trailing edge 38. Additionally, the rotor blade assembly 20 may include a root end 40 (defined by the first blade segment 22) configured to be mounted to the hub 18 (FIG. 1) of a wind turbine 10 and tip end 42 (defined by the second blade segment 24) disposed opposite the root end 40. Further, the rotor blade assembly 20 may have a span 44 defining the total length between the root end 40 and the tip end 42 and a chord 46 defining the total length between the leading edge 36 and the trailing edge 38. As is generally understood, the chord 46 may generally vary in length with respect to the span 44 as the rotor blade extends from the blade root 40 to the blade tip 42.

Figure 3:
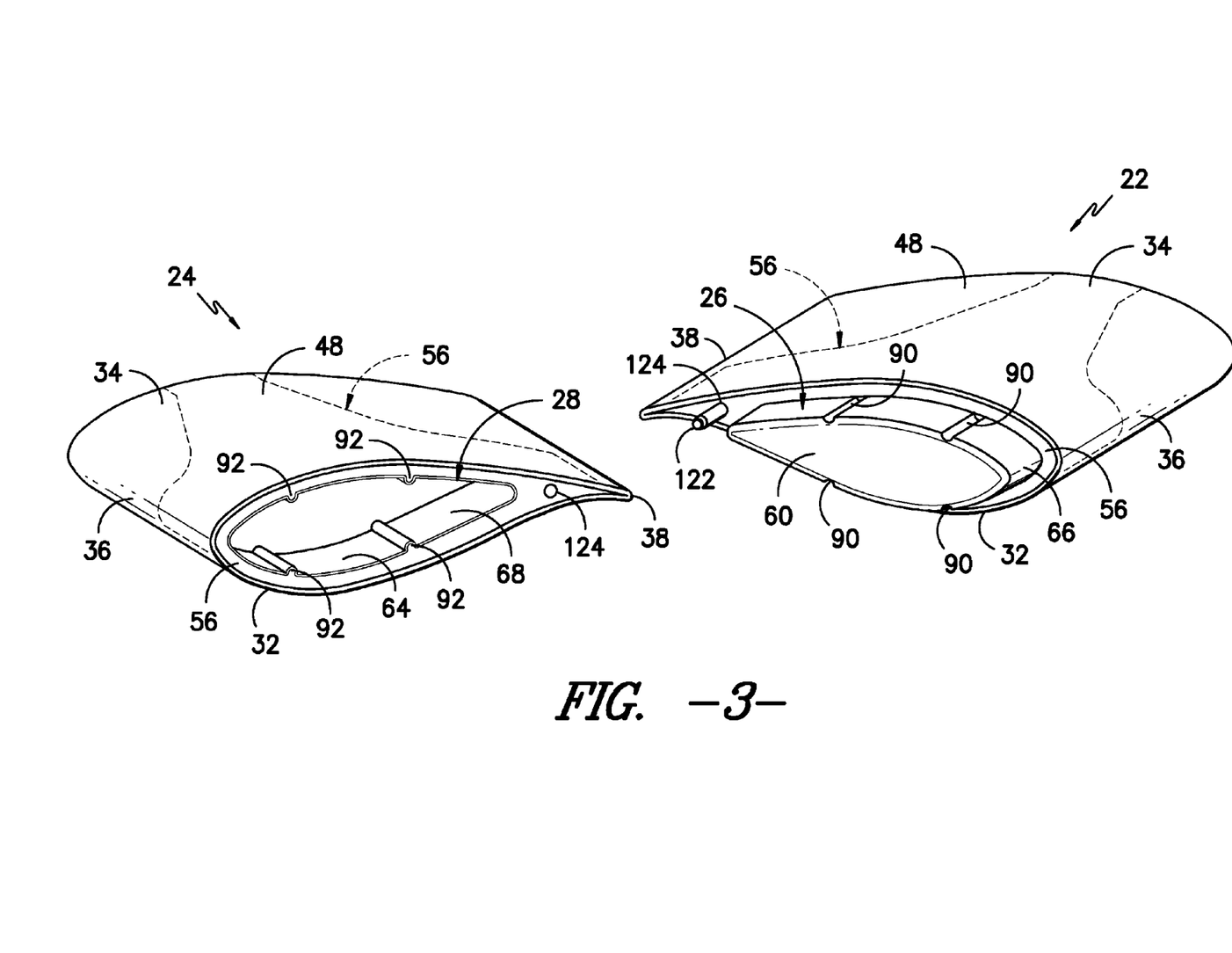
FIG. 3 illustrates partial perspective views of embodiments of a first blade segment and a second blade segment of the disclosed rotor blade assembly in accordance with aspects of the present subject matter.
Figure 4:
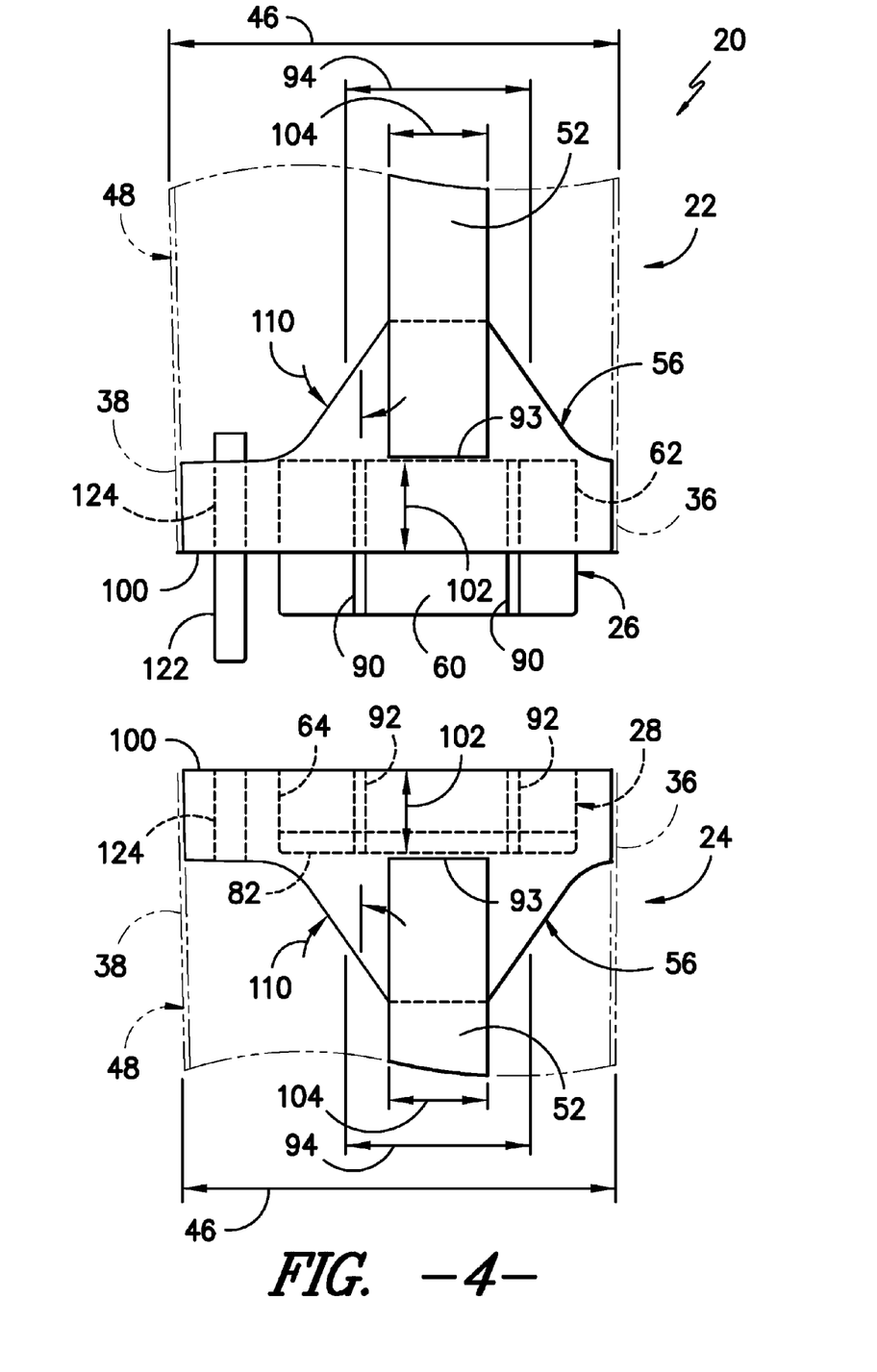
FIG. 4 illustrates a partial, top/suction side view of the embodiments of the first and second blade segments shown in FIG. 3, particularly illustrating the body shell of the first and second blade segments in phantom lines to provide a view of the interior of the blade segments.
Figure 5:
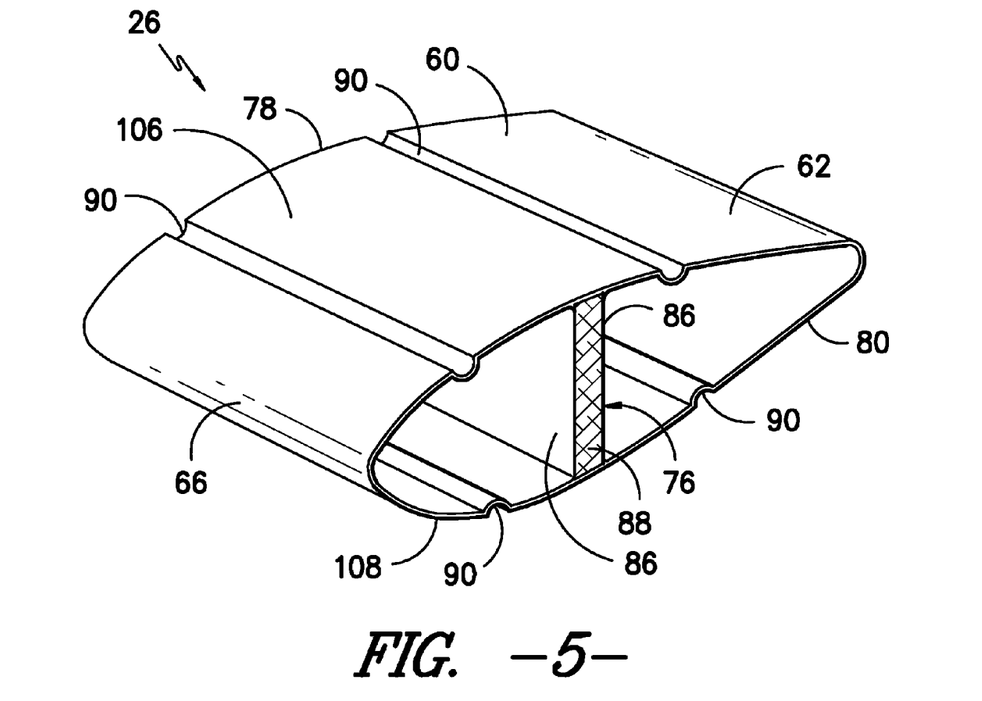
FIG. 5 illustrates a rear perspective view of one embodiment of a post member of the rotor blade assembly in accordance with aspects of the present subject matter.
Figure 6:
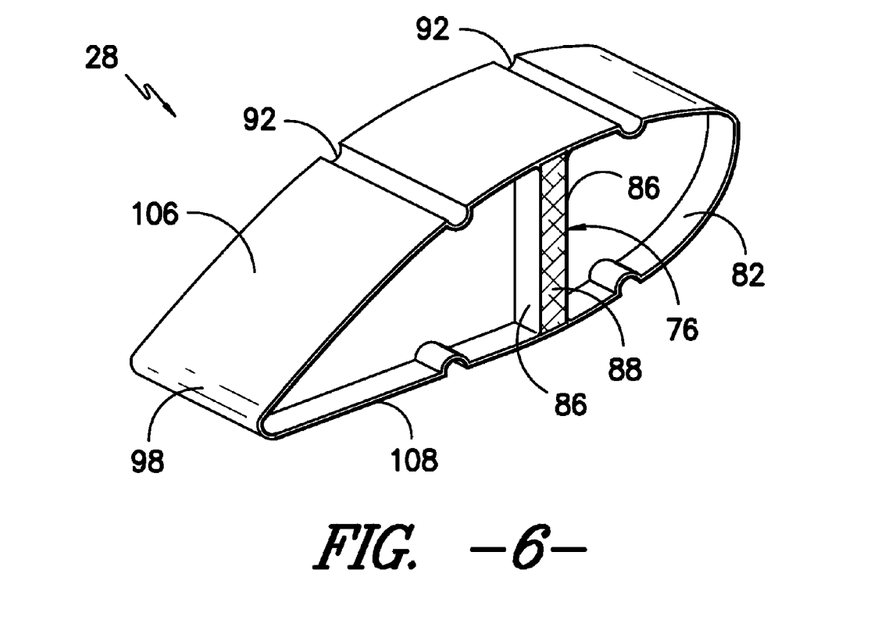
FIG. 6 illustrates a rear perspective view of one embodiment of a recess member of the rotor blade assembly in accordance with aspects of the present subject matter.
Figure 7:
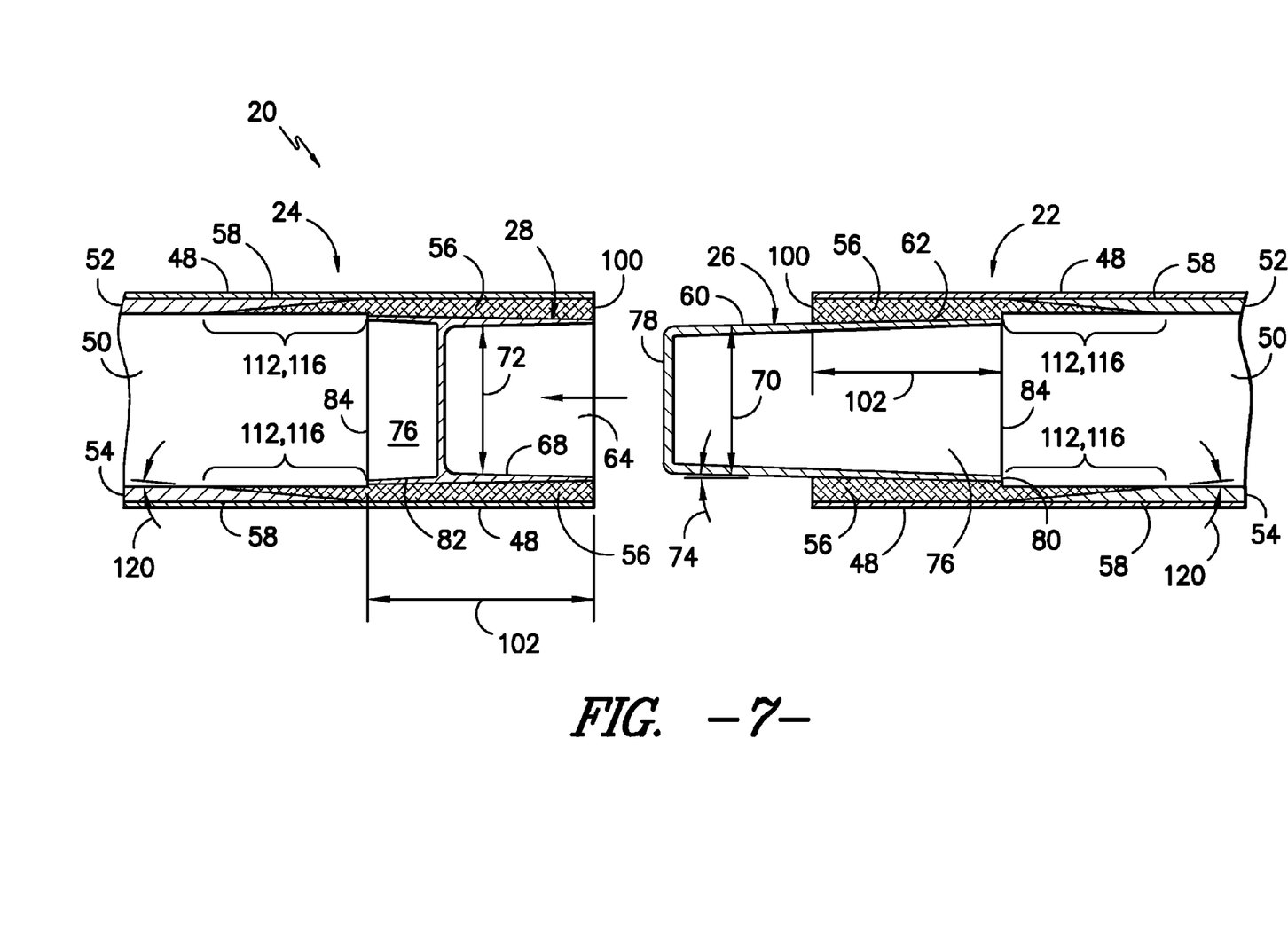
FIG. 7 illustrates a cross-sectional view of the first and second blade segments shown in FIG. 3; and, FIG. 8 illustrates a partial, rear perspective view of one of the blade segments shown in FIG. 3, particularly illustrating the structural components and the spar member of the blade segment.
Figure 8:
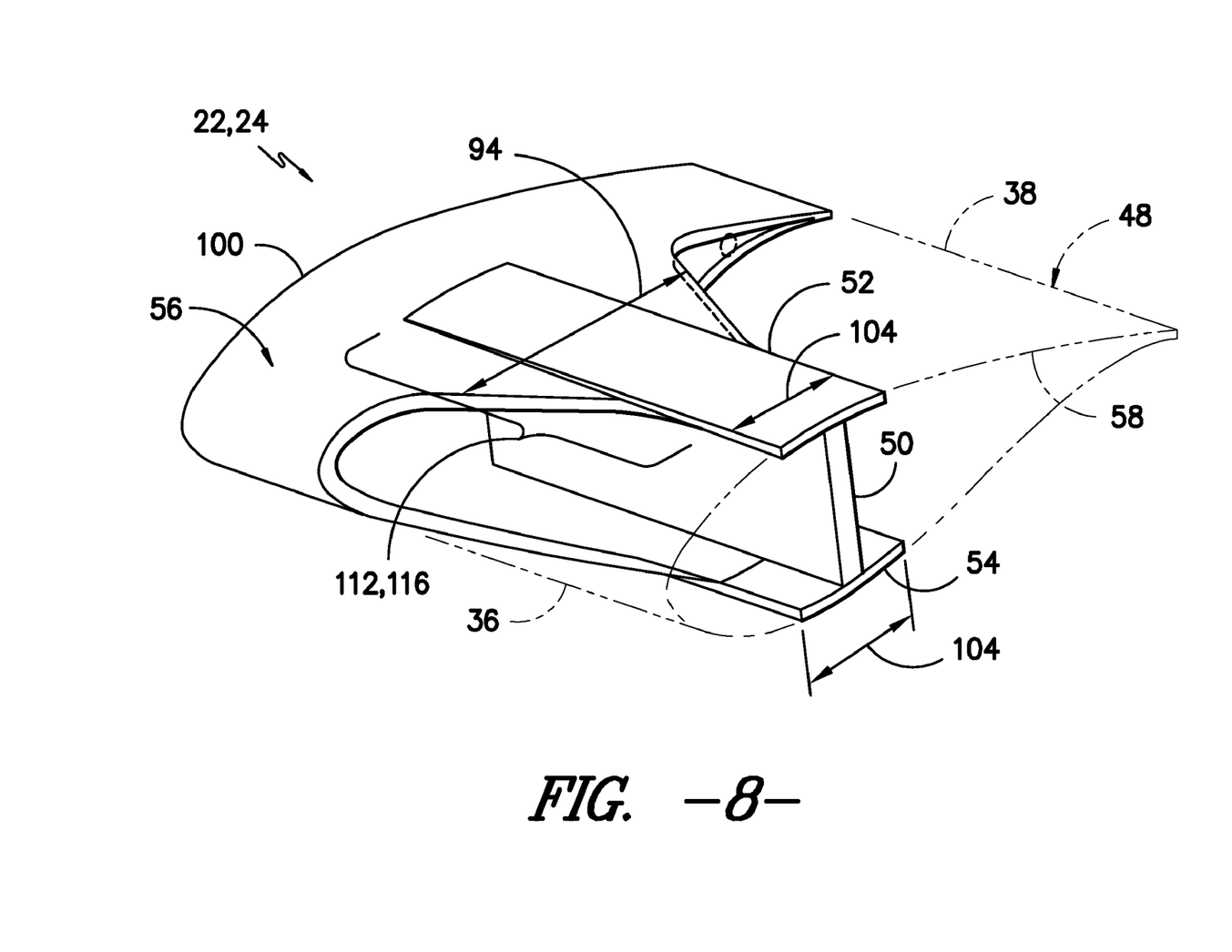

Referring now to FIGS. 3-8, several views of the various components and features of the first and second blade segments 22, 24 of the disclosed rotor blade assembly 20 are illustrated in accordance with aspects of the present subject matter. In particular, FIG. 3 illustrates a partial perspective view of one embodiment of the first and second blade segments 22, 24, particularly illustrating the attachment members 26, 28 of each blade segment 22, 24. FIG. 4 illustrates a partial suction side view of the first and second blade segments 22, 24, with the body shell 48 of each segment 22, 24 being shown in phantom lines so as to illustrate the interior of the blade segments 22, 24. FIGS. 5 and 6 illustrate rear perspective views of the attachment members 26, 28 of the blade segments 22, 24. FIG. 7 illustrates a cross-sectional view of the first and second blade segments 22, 24 of the rotor blade assembly 20. FIG. 8 illustrates a partial, rear perspective view of one of the blade segments 22, 24, particularly illustrating the structural components 50, 52, 54 and the spar member 56 of the blade segment 22, 24.

Each blade segment 22, 24 of the rotor blade assembly 20 may include a body shell 48 generally serving as the outer casing/covering of the blade segment 22, 24. The body shell 48 may generally define a substantially aerodynamic profile, such as by defining a symmetrical or cambered airfoil shaped cross-section. Thus, as shown in FIG. 3, the body shell 48 of each blade segment 22, 24 may define a pressure side 32, suction side 34, leading edge 36 and trailing edge 38 of the rotor blade assembly 20. In general, it should be appreciated that the aerodynamic profile of the body shell 48 of the first blade segment 22 may generally correspond to the aerodynamic profile of the body shell 48 of the second blade segment 24 in the area adjacent to the joint 30 (FIG. 2) of the rotor blade assembly 20. As such, the rotor blade assembly 20 may define a substantially continuous aerodynamic profile along its span 44.

In several embodiments, the body shell 48 of each blade segment 22, 24 may be formed as a single, unitary component. Alternatively, the body shell 48 may be formed from a plurality of shell components. For example, the body shell 48 may be manufactured from a first shell component generally defining the pressure side 32 of the body shell 48 and a second shell component generally defining the suction side 34 of the body shell 48, with such shell components being secured to one another at the leading and trailing edges 36, 38 of the shell 48. Additionally, the body shell 48 may generally be formed from any suitable material. For instance, in one embodiment, the body shell 48 may be formed entirely from a composite laminate material, such as a carbon fiber-reinforced composite or a glass fiber-reinforced composite. Alternatively, one or more portions of the body shell 48 may be configured as a layered construction and may include a core material, formed from a lightweight material such as wood (e.g., balsa), foam (extruded polystyrene foam) or a combination of such materials, disposed between layers of composite laminate material.

Each of the blade segments 22, 24 may also include one or more structural components. For example, as particularly shown in FIGS. 7 and 8, the blade segments 22, 24 may each include a single shear web 50 configured to extend longitudinally within the blade shell 48 and perpendicularly between opposed spar caps 52, 54. Alternatively, the blade segments 22, 24 may include two or more shear webs 50 extending between the opposed spar caps 52, 54. The spar caps 52, 54 may similarly be configured to extend longitudinally within the blade shell 48, with the spar caps 52, 54 generally engaging an inner surface 58 of the pressure and suction sides 32, 34 of the body shell 48, respectively. In general, the shear web(s) 50 and spar caps 52, 54 may serve as beam-like or other structural-type component for providing structural rigidity and increased strength to each blade segment 22, 24 and, thus, the rotor blade assembly 20. It should be appreciated that the shear web(s) 50 and the spar caps 52, 54 may generally be formed of any suitable material that permits such components to function as described herein. For example, in one embodiment, the spar caps 52, 54 may be formed from a composite material, such as a unidirectional carbon fiber-reinforced composite, and the shear web(s) 50 may be formed from foam, wood or a similar lightweight material strengthened with a fiber-reinforced composite.

As indicated above, the first and second blade segments 22, 24 may also include corresponding attachment members 26, 28 configured to permit the blade segments 22, 24 to be assembled together to form the rotor blade assembly 20 of the present subject matter. In general, the attachment members 26, 28 may comprise any suitable corresponding male and female components which are configured to assist in aligning the blade segments 22, 24 together for assembly and/or to facilitate in transferring any bending moments and/or loads occurring on the rotor blade assembly 20 during operation of the wind turbine 10. For example, in the illustrated embodiment, the first blade segment 22 may comprise a post member 26 configured to at least partially be received within a corresponding recess member 28 of the second blade segment 24. As such, the blade segments 22, 24 may be properly aligned with one another by inserting the post member 26 of the first blade segment 22 into the recess member 28 of the second blade segment 24. It should be appreciated that, although the post and recess members 26, 28 are generally described herein as being components of the first and second blade segments 22, 24, respectively, the components may also be reversed, with the first blade segment 22 including a recess member 28 and the second blade segment 24 including a post member 26.

Referring particularly to FIGS. 3, 4 and 7, the post member 26 may generally be configured as any suitable male component and may include a first portion 60 extending outwardly from the body shell 48 of the first blade segment 22 in a generally spanwise direction (a direction parallel to the span 44 of the rotor blade assembly 20). The post member 26 may also include a second portion 62 mounted or otherwise disposed within the body shell 48 of the first blade segment 22. Additionally, the recess member 28 may generally be configured as any suitable female component and may be mounted or otherwise disposed within the body shell 48 of the second blade segment 22.

In general, the first portion 60 of the post member 26 may be configured to be received within a corresponding cavity 64 defined by the recess member 28. Thus, it should be appreciated that the first portion 60 of the post member 26 and the cavity 64 of the recess member 28 may generally have any suitable shape and/or configuration which permits the first portion 60 to be received within the cavity 64. For example, in the illustrated embodiment, the first portion 60 may have an airfoil shape generally corresponding to the airfoil-shaped cross-section of the first blade segment 22. Thus, in such an embodiment, the recess member 28 may generally define a mating airfoil-shaped cavity 64. However, in alternative embodiments, the first portion 60 and the cavity 64 may define corresponding rectangular, circular, elliptical or triangular shapes or have any other suitable mating configuration.

Additionally, in one embodiment, the first portion 60 and the cavity 64 may be designed to have tightly controlled dimensions such that the first portion 60 may be securely positioned within the cavity 64. For instance, the first portion 60 and the cavity 64 may be dimensioned so that the total clearance between an outer perimeter of the first portion 60 (defined by the outer surface 66 of the post member 26) and an inner perimeter of the cavity 64 (defined by the inner surface 68 of the cavity 64) is less than 20 millimeters (mm), such as less than 10 mm or less than about 5 mm.

Additionally, in one embodiment, the post and recess members 26, 28 may define corresponding tapered profiles or may otherwise be correspondingly drafted to ensure proper positioning of the first portion 60 of the post member 26 within the cavity 64 of the recess member 28. Thus, as shown in the cross-sectional view of FIG. 7, the post member 26 may be configured such that a height 70 of the first portion 60 continuously decreases as the first portion extends into the cavity 64. Similarly, the recess member 28 may be configured such that a height 72 of the cavity 64 correspondingly decreases along its length. It should be appreciated that the corresponding tapered profiles of the post and recess members 26, 28 may generally have any suitable taper angle 74. However, in a particular embodiment of the present subject matter, the taper angle 74 may be equal to an angle ranging from about 0 degrees to about 10 degrees, such as from about 0 degrees to about 5 degrees or from about 1 degree to about 2 degrees and all other subranges therebetween.

In one embodiment, the post and recess members 26, 28 may also include a secondary shear web 76 for providing additional structural support to the blade segments 22, 24. For example, as shown in the rearward perspective view of FIG. 5 and the cross-sectional view of FIG. 7, a secondary shear web 76 may generally extend longitudinally within the interior of the post member 26 between the ends 78, 80 of the post member 26. Similarly, as shown in the rearward perspective view of FIG. 6 and the cross-sectional view of FIG. 7, the recess member 28 may define a second cavity 82 within which a secondary shear web 76 may be disposed. As shown, the second cavity 82 may generally be formed within the recess member 28 so as to be disposed opposite the cavity 64 configured to receive the post member 26. It should be appreciated that, in alternative embodiments, only one of the attachment members 26, 28 (e.g., the post member 26) may include a secondary shear web 76. Additionally, it should be appreciated that the post and recess members 26, 28 may include any number of secondary shear webs 76 (e.g., two or more) for providing structure support to the blade segments 22, 24, particularly when the segments 22, 24 include more than one shear web 50 extending between the spar caps 52, 54.

In several embodiments, the secondary shear webs 76 of the post and recess members 26, 28 may be configured to be attached to the shear web(s) 50 of the first and second blade segments 22, 24, respectively. For example, as shown in FIG. 7, the secondary shear webs 76 may be configured to be attached to the shear webs(s) 50 at a web interface 84 defined between the secondary shear webs 76 and the shear webs 50. In general, it should be appreciated that the secondary shear webs 76 may be attached to the shear webs 50 of the first and second blade segments 22, 24 using any suitable means. For example, in one embodiment, the secondary shear webs 76 may be adhesively bonded to the shear webs 50. In such an embodiment, it may be desirable to a perform a wet lay-up process and/or otherwise hand laminate several plies of reinforcing material at the web interface 84 to reinforce the seam and ensure proper attachment of the secondary shear webs 76 to the shear web(s) 50. In alternative embodiments, the secondary shear webs 76 may be configured to be attached to the shear webs 50 using any other suitable fastening means, such as by using screws, bolts, a tongue and groove fit, interference fit, brackets or using any other suitable dry-fit attachment mechanism and/or method.

Additionally, in a particular embodiment of the present subject matter, the secondary shear webs 76 may be configured the same or similarly to the shear webs 50 of the first and second blade segments 22, 24. Thus, in one embodiment, the secondary shear webs 76 may comprise a core material strengthened with a composite material. For example, as shown in FIGS. 5 and 6, the secondary shear members 76 may include oppositely facing walls 86 formed form any suitable composite material, such as a carbon- or glass-reinforced laminate. Additionally, a core or filler material 88, such as wood (e.g., balsa), foam (extruded polystyrene foam) or any other suitable lightweight material, may be disposed between the walls 86. In alternative embodiments, it should be appreciated that the secondary shear webs 76 may be formed from any other suitable material and may generally have any suitable configuration that permits the secondary shear webs 76 to function as described herein.

Further, in one embodiment of the present subject matter, the post and recess members 26, 28 may define corresponding alignment features 90, 92 configured to further facilitate alignment of the first and second blade segments 22, 24. For example, as shown in FIGS. 3, 5 and 6, the first portion 60 of the post member 26 may define a plurality of longitudinally extending channels 90 configured to mate with a plurality of longitudinally extending ribs 92 defined by the cavity 64 of the recess member 28. As such, the ribs 92 of the recess member 28 may be received within the channels 90 of the post member 26 as the post member 26 is inserted into the recess member 28. It should be appreciated that, in an alternative embodiment, the longitudinally extending ribs 92 may be defined the post member 26 while the longitudinally extending channels 90 may be defined by the recess member 28. It should also be appreciated that the post and recess members 26, 28 may generally define any suitable type of alignment feature and, thus, need not include the ribs 92 and channels 90 shown in FIGS. 3, 5 and 6. For instance, in another embodiment, the post and recess members 26, 28 may include a corresponding tongue and groove configuration or a similar keyed configuration.

Moreover, it should be appreciated that the post and recess members 26, 28 may generally be formed from any suitable material(s). For example, in one embodiment, the post and recess members 26, 28 may be formed from any suitable laminate composite material. It should also be appreciated that the first and second blade segments 22, 24 may include more than one post or recess member 26, 28 respectively. For instance, the first blade segment 22 may include two or more post members 26 at least partially extending outwardly from the body shell 48 in a generally spanwise direction. In such an embodiment, the second blade segment 24 may include an equal number of corresponding recess members 28. Additionally, in another embodiment, the first blade segment 22 may include both post and recess members 26, 28 and the second blade segment 24 may include corresponding post and recess members 26, 28.

To permit the post and recess members 26, 28 to be securely mounted or otherwise disposed within the first and second blade segments 22, 24, the blade segments 22, 24 may each include a spar member 56 extending outwardly from the spar caps 52, 54 of the segments 22, 24. In general, the spar members 56 of the present subject matter may be configured to support the second portion 62 of the post member 26 and the recess member 28 within the first and second blade segments 22, 24, respectively. Additionally, the spar members 56 may also be configured to evenly transfer or otherwise diffuse the bending moments and/or other loads concentrated in the spar caps 52, 54 of the blade segments 22, 24 throughout the joint 30. In particular, the spar members 26 may be configured to evenly transfer or otherwise diffuse the loads from the spar caps 52, 54 across at least a portion of the width of the post and recess members 26, 28.

Referring to FIGS. 3, 4 and 8, the spar members 56 may generally be configured as an extension of the spar caps 52, 54 of each blade segment 22, 24. For example, as particularly shown in 4, in one embodiment, the spar caps 52, 54 (one of which is shown) may terminate within the body shell 48 or may otherwise include terminating ends 93 at or adjacent to the post or recess member 26, 28 of the blade segments 22, 24. As such, the spar members 56 of the blade segments 22, 24 may be provided to support the post and recess members 36, 38 and evenly transfer loads carried through the spar caps 52, 54 beyond such terminating ends 93. Accordingly, the spar members 56 may be configured to extend outwardly from the spar caps 52, 54 along the inner surfaces 58 of the pressure and suction sides 32, 34 of each body shell 48 such that at least a portion of the outer perimeter of the second portion 62 of the post member 26 (defined by the outer surface 66 of the post member 36) and at least a portion of the outer perimeter of the recess member 28 (defined by the outer surface 98 (FIG. 5) of the recess member 28) is engaged by or is otherwise supported by the spar member 56 within each respective blade segment 22, 24.

For example, in the illustrated embodiment, the spar members 56 may be configured to extend outwardly in a generally spanwise direction from the spar caps 52, 54 to the joint end 100 of each blade segment 22, 24 such that an entire interior length 102 of the post and recess members 26, 28 may be engaged or otherwise supported by the spar members 56. In an alternative embodiment, the spar member 56 may be configured to extend outwardly from the spar caps 52, 54 in a generally spanwise direction such that only a portion of the interior length 102 of the post and recess members 26, 28 is engaged or otherwise supported by the spar members 56. Additionally, the spar members 56 may generally be configured to extend outwardly from the spar caps 52, 54 in a generally chordwise direction such that a chordwise width 94 of the spar members 58 is greater than a chordwise width 104 of the spar caps 52, 54. For instance, in the illustrated embodiment, the spar members 56 may be configured to extend outwardly from the spar caps 52, 54 such that the chordwise width 94 of the spar members 56 at the joint end 100 of each blade segment 22, 24 is generally equal to the chord 46 of each respective blade segment 22, 24. Thus, as shown in FIGS. 3, 4 and 8, the width 94 of each spar member 56 may diverge from the spar caps 52, 54 such that the spar member 56 extends between the leading and trailing edges 36, 38 of each body shell 48 so as to fill the entire cross-section of the blade segments 22, 24. In another embodiment, the spar members 56 may not extend between the leading and trailing edges 36, 38 but may only be configured extend over and around the entire outer perimeters of the post and recessed members 26, 28 so as to fully encompass and support such members 26, 28. In a further embodiment, the width 94 of the spar members 56 may only be configured to diverge over a portion of the outer perimeters of the post and recessed members 26, 28. For instance, the spar members 56 may be configured to only extend in a chordwise direction over all or a portion of the top and bottom faces 106, 108 (FIGS. 5 and 6)

of the post and recess members 26, 28. In such an embodiment, it should be appreciated that each spar member 56 may generally comprise a separate pressure side segment extending over the top face 106 of the post or recess member 26, 28 and a separate suction side segment extending over the bottom face 108 of the post or recess member 26, 28.

Additionally, in a particular embodiment of the present subject matter, the spar members 56 may be configured to extend outwardly from the spar caps 50, 52 at a particular divergence angle 110 (FIG. 4). For example, in one embodiment, the divergence angle 110 of the spar members 56 may range from about 45 degrees to about 75 degrees, such as from about 50 degrees to about 70 degrees or from about 55 degrees to about 65 degrees and any other subranges therebetween. In an alternative embodiment, it should be appreciated that the divergence angle 110 of the spar member 56 may be less than 45 degrees or greater than 75 degrees.

It should be appreciated that the spar members 56 of the present subject matter may generally be formed from any suitable material. However, in a particular embodiment, the spar members 56 may be formed from a composite laminate material, such as a fiberglass-reinforced composite. Additionally, in various embodiments of the present subject matter, the spar members 56 may be formed integrally with the spar caps 52, 54 or may be formed as separate components, such as by separately manufacturing and pre-curing the spar members 56 or by separately forming the spar members 56 within each body shell 48. For instance, in the illustrated embodiment, the spar members 56 may be formed separately from the spar caps 52, 54 and may be configured to engage or otherwise be attached to a portion the spar caps 52, 54. Thus, as shown in FIG. 7, each spar member 56 may include tapered sections 112 configured to mate with corresponding tapered sections 116 of the pressure and suction side spar caps 50, 52. It should be appreciated that the tapered sections 112, 116 of the spar members 56 and the spar caps 52, 54 may generally define any suitable taper angle 120. However, in a particular embodiment of the present subject matter, the taper angle 120 may be equal to an angle ranging from about 0 degrees to about 10 degrees, such as from about 0 degrees to about 5 degrees or from about 1 degree to about 2 degrees and all other subranges therebetween. It should also be appreciated that, in one embodiment, the spar members 56 may further include tapered sections (not shown) disposed along the top and bottom faces 106, 108 (FIGS. 5 and 6) of the post and recess members 26, 28 such that the thickness of each spar member 56 increases or decreases as it extends in the spanwise direction towards the joint end 100 of each blade segment 22, 24. In such an embodiment, the post and recess members 26, 28 may further include corresponding tapered sections (not shown) such that a suitable taper angle is defined between the spar members 56 and the post and recess members 26, 28.

Further, as is generally understood, wind turbines 10 (FIG. 1) are typically equipped with a lightning conduction system (not shown) configured to protect the wind turbine 10 and its components from lightning strikes. For example, a lightning conduction system may typically include one or more electrically conducting lightning receptors (e.g., a copper receptor) disposed at various locations along the length of a rotor blade. The lightning receptors may then be coupled to a wire (e.g., a copper wire) running from the receptor through the rotor blade and the tower of the wind turbine, where it is connected to the ground. Accordingly, in a particular embodiment of the present subject matter, the spar members 56 of the first and second blade segments 22, 24 may be configured to receive an electrically conducting member 122, such as a metal pin or rod, to permit the lightning conduction system to be operable through the joint 30 of the disclosed rotor blade assembly 20. Thus, as shown in FIGS. 3 and 8, the spar members 56 may define corresponding openings 124 configured to receive the electrically conducting member 122. The wire of the lightning conduction system may then be electrically coupled to the ends of the electrically conducting member 122. Alternatively, the openings 124 defined in the spar members 56 may simply serve as a channel through which the wire of the lighting conduction system may extend. It should be appreciated that, in embodiments in which the spar members 56 defined openings 124 configured to receive an electrically conducting member 122, the electrically conducting member 122 may generally serve as an additional alignment feature for the blade segments 22, 24.

As indicated above, it should be apparent to those of ordinary skill in the art that, although the rotor blade assembly 20 of the present subject matter is illustrated and described herein as including two blade segments 22, 24, the rotor blade assembly 20 may generally comprise any number of blade segments. For example, in an embodiment in which the rotor blade assembly 20 is formed from three or more blade segments, each inner blade segment (i.e., the blade segment(s) not defining the tip and root ends 40, 42 of the rotor blade assembly 20) may generally include an attachment member 26, 28 (e.g., a post or recess member 26, 28) and a spar member 56 at each end.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blade segment of a rotor blade assembly formed from two or more blade segments, the blade segment comprising:
   a body shell defining a generally aerodynamic profile;
   a shear web extending longitudinally within the body shell, the shear web being disposed between opposed spar caps;
   an attachment member at least partially disposed within the body shell, the attachment member configured to mate with a corresponding attachment member of a secondary blade segment; and,
   a spar member extending outwardly from the spar caps, the spar member being configured to support the attachment member within the body shell,
   wherein a chordwise width of the spar member diverges as the spar member extends from the spar caps such that the spar member engages at least a portion of an outer perimeter of the attachment member.

2. The blade segment of claim 1, wherein the attachment member comprises a recess member or a post member.

3. The blade segment of claim 1, wherein the attachment member comprises a secondary shear web configured to be connected to the shear web.

4. The blade segment of claim 1, wherein the attachment member defines an alignment feature configured to mate with an alignment feature of the corresponding attachment member.

5. The blade segment of claim 1, wherein the spar member extends outwardly from the spar caps along an inner surface of the body shell such that the chordwise width of the spar member is greater than a width of the spar caps.

6. The blade segment of claim 1, wherein the chordwise width of the spar member diverges as the spar member extends from the spar caps such that the spar member is configured to encompass the entire outer perimeter of the attachment member.

7. The blade segment of claim 6, wherein the spar member is further configured such that the chordwise width of the spar member extends fully between a leading edge and a trailing edge of the body shell.

8. The blade segment of claim 1, wherein the spar member includes tapered sections configured to engage corresponding tapered sections of the spar caps.

9. A rotor blade assembly for a wind turbine, the rotor blade assembly comprising:
 a first blade segment comprising:
  a body shell defining a generally aerodynamic profile;
  a shear web extending longitudinally within the body shell, the shear web being disposed between opposed spar caps;
  a post member having a first portion extending outwardly from the body shell and a second portion disposed within the body shell; and;
  a spar member extending outwardly from the spar caps, the spar member defining a diverging chordwise width such that the spar member engages at least a portion of an outer perimeter of the second portion of the post member; and,
 a second blade segment comprising:
  a body shell defining a generally aerodynamic profile;
  a shear web extending longitudinally within the body shell, the shear web being disposed between opposed spar caps;
  a recess member disposed within the body shell, the recess member defining a cavity configured to receive the first portion of the post member; and,
  a spar member extending outwardly from the spar caps, the spar member defining a diverging chordwise width such that the spar member engages at least a portion of an outer perimeter of the recess member.

10. The rotor blade assembly of claim 9, wherein the spar member of the first and second blade segments extends outwardly from the spar caps along an inner surface of the body shell such that the chordwise width of the spar member is greater than a width of the spar caps.

11. The rotor blade assembly of claim 9, wherein the chordwise width of the spar members of the first and second blade segments diverges as the spar members extend from the spar caps such that the spar members engage the entire outer perimeter of the post and recess members.

12. The rotor blade assembly of claim 11, wherein the spar member of the first and second blade segments is further configured such that the chordwise width of the spar member extends fully between a leading edge and a trailing edge of the body shell of the first and second blade segments.

13. The rotor blade assembly of claim 9, wherein the post member defines a tapered profile configured to correspond to a tapered profile of the recess member.

14. The rotor blade assembly of claim 9, wherein a taper angle of the tapered profiles of the post and recess members ranges from about 0 degrees to about 10 degrees.

15. The rotor blade assembly of claim 9, wherein the post member comprises a secondary shear web extending longitudinally within the post member, the secondary shear web configured to be connected to the shear web of the first blade segment.

16. The rotor blade assembly of claim 9, wherein the recess member comprises a second cavity and a secondary shear web disposed within the second cavity, the secondary shear web configured to be connected to the shear web of the second blade segment.

17. The rotor blade assembly of claim 9, wherein the post member defines an alignment feature configured to be mate with a corresponding alignment feature of the recess member.

18. The rotor blade assembly of claim 17, wherein the post member defines a plurality of channels configured to mate with a plurality of ribs defined in the recess member.

19. The rotor blade assembly of claim 9, wherein the spar member of the first and second blade segments includes a tapered section configured to engage a corresponding tapered section of the spar caps.

20. The rotor blade assembly of claim 9, wherein the spar member of the first and second blade segments defines an opening configured to receive a component of a lightning conduction system of the rotor blade assembly.

* * * * *

UNITED STATES PATENT AND TRADEMARK OFFICE
CERTIFICATE OF CORRECTION

| | | |
|---|---|---|
| PATENT NO. | : 7,922,454 B1 | Page 1 of 1 |
| APPLICATION NO. | : 12/915686 | |
| DATED | : April 12, 2011 | |
| INVENTOR(S) | : Scott Gabell Riddell | |

It is certified that error appears in the above-identified patent and that said Letters Patent is hereby corrected as shown below:

Col. 12, In claim 17, line 30 it reads "...member defines an alignment feature configured to be mate..."

it should read "...member defines an alignment feature configured to mate..."

Signed and Sealed this

Fourth Day of October, 2011

David J. Kappos
*Director of the United States Patent and Trademark Office*